United States Patent
Pasirstein (10) Patent No.: US 10,261,711 B1
(45) Date of Patent: Apr. 16, 2019

(54) PROOF OF NON-TAMPERING FOR STORED DATA

(71) Applicant: Merck Sharp & Dohme Corp., Rahway, NJ (US)

(72) Inventor: David Brett Pasirstein, Morristown, NJ (US)

(73) Assignee: Merck Sharp & Dohme Corp., Rahway, NJ (US)

( * ) Notice: Subject to any disclaimer, the term of this patent is extended or adjusted under 35 U.S.C. 154(b) by 0 days.

(21) Appl. No.: 15/880,476

(22) Filed: Jan. 25, 2018

(51) Int. Cl.
| | |
|---|---|
| G06F 3/06 | (2006.01) |
| H04L 9/06 | (2006.01) |
| H04L 9/32 | (2006.01) |
| G06F 16/23 | (2019.01) |
| G06F 16/27 | (2019.01) |
| G06F 21/62 | (2013.01) |
| H04L 29/08 | (2006.01) |
| G06F 16/907 | (2019.01) |

(52) U.S. Cl.
CPC ........... *G06F 3/0623* (2013.01); *G06F 16/23* (2019.01); *G06F 16/27* (2019.01); *G06F 16/907* (2019.01); *G06F 21/6218* (2013.01); *H04L 9/0637* (2013.01); *H04L 9/3236* (2013.01); *H04L 67/104* (2013.01); *H04L 2209/38* (2013.01)

(58) Field of Classification Search
CPC ............ G06F 3/0623; G06F 17/30283; G06F 17/30345; G06F 17/30997; G06F 21/6218; G06F 16/23; G06F 16/907; G06F 16/27; H04L 9/3236; H04L 9/0637; H04L 67/104; H04L 2209/38
See application file for complete search history.

(56) References Cited

U.S. PATENT DOCUMENTS

| | | | |
|---|---|---|---|
| 2003/0004970 A1* | 1/2003 | Watts | G06F 17/30362 |
| 2008/0120297 A1* | 5/2008 | Kapoor | G06F 17/30348 |
| 2018/0005186 A1* | 1/2018 | Hunn | G06Q 10/10 |

OTHER PUBLICATIONS

Miles, Blockchain security: What keeps your transaction data, 12 pages, Dec. 12, 2017.*
Ray, Merkle Trees Hacker Noon, 6 pages, Dec. 15, 2017.*
Senta, How Blockchain Structures Prevent Data Tampering?, 13 pages, Sep. 29, 2017.*
Prusty, Building Blockchain Projects, 2 pages, Apr. 27, 2017.*

* cited by examiner

*Primary Examiner* — Albert M Phillips, III
(74) *Attorney, Agent, or Firm* — Fenwick & West LLP (57) ABSTRACT

An application shim receives transactions that will update a portion of data stored in an existing data store. A reduced representation of the pre-update portion of data is generated and compared to an existing reduced representation of the same portion of data to verify that the data has not been tampered with. An updated reduced representation is generated based on the post-update portion of data. The updated reduced representation is added to a distributed ledger such as a block chain. Further verification of non-tampering may be provided by comparing the reduced representation stored by the system and the one appended to the blockchain. If a discrepancy is identified, appropriate corrective action may be taken, such as blocking further transactions, notifying responsible entities, and/or restoring the data from a backup.

20 Claims, 7 Drawing Sheets

PROOF OF NON-TAMPERING FOR STORED DATA

TECHNICAL FIELD

The disclosure generally relates to the field of data verification, and in particular to detecting and handling unauthorized modifications of data.

BACKGROUND

In many contexts, the ability to verify the existence and history of data is valuable. For example, in the medical and financial fields, regulators require that certain records are kept and proving that digital records existed on a certain date and have not been altered may be important for companies and individuals to demonstrate compliance. As another example, in some research contexts, it may be important for scientists to be able to demonstrate the date on which certain discoveries were made with verifiable data.

In some situations, unauthorized manipulation of data can lead to expensive problems. Altered data may be misleading, resulting in delays in bringing a new product to market. Such delays may also enable a competitor to be first to market or extend a competitor's period of market exclusivity unnecessarily. Conversely, altered data may also lead to an unsafe product being released, potentially exposing the company to liability in future. Thus, a system that could detect unauthorized manipulations of stored data would provide value to companies and enable them to limit the impact of such events.

BRIEF DESCRIPTION OF THE DRAWINGS

The disclosed embodiments have advantages and features which will be more readily apparent from the detailed description, the appended claims, and the accompanying figures (or drawings). A brief introduction of the figures is below.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Configuration Overview

Distributed ledgers were developed as a means for parties to engage in transactions, e.g., financial transactions, without the need for a single, trusted intermediary. In such systems, each transaction is recorded independently by several nodes (e.g., on a blockchain). No one entity controls all of the nodes so it is impossible (or at least exceedingly difficult) for a malicious actor to alter the transaction once it has been recorded by the nodes. Accordingly, the transactions can be conducted without the parties needing to trust each other, or any individual node provider. Although the terms "distributed ledger" and "blockchain" are used in discussion of various embodiments below, one of skill in the art will recognize that other forms of distributed storage, such as a distributed database, may be used without departing from the spirit or scope of what is disclosed. Thus, references to distributed ledgers and blockchains should be considered to encompass these other forms of distributed storage.

The use of distributed ledgers to provide cryptographically verifiable records is not limited to financial transactions. Once a data item has been added to a distributed ledger, it becomes extremely difficult to alter as they are essentially immutable and subject to inquiry and additional analysis when they fork. That data item, as well as the time it was added to the ledger, can be viewed by anyone with access to the ledger. In typical cases, the nodes of a distributed ledger can be accessed publicly via the internet, thus making the data item and its history available to anyone with an internet-enabled computer and appropriate software.

Disclosed by way of example embodiment is a configuration that may include a method (and/or corresponding system and computer-readable medium storing instructions executable by one or more processors) for verifying an absence of data tampering. An example configuration may include receiving a transaction sent by an application that identifies a portion of data stored in a data store. The transaction includes an update to the portion of data. The pre-update content of the portion of data is retrieved and a new reduced representation (e.g., a hash) of the pre-update content is generated. The new reduced representation is compared to an existing reduced representation for the same portion of data that was previously generated.

If the two do not match, this may indicate an unauthorized modification to the data has occurred. Conversely, if the two reduced representations match, this indicates that the portion of data has not been tampered with. The existing reduced representation may then be updated to reflect the new content of the portion of data, as modified by the update. The updated reduced representation may also be appended to a distributed ledger (e.g., a blockchain). Because data that has been anchored to the distributed ledger is exceedingly difficult to modify, the appended reduced representation can be used to verify that the locally stored reduced representation has not been modified improperly (e.g., by a malicious actor trying to cover up an unauthorized change to the data by altering logs or the like).

Anchoring to the distributed alone may provide a reasonably high degree of confidence that the corresponding data has not been tampered with. However, problems may still arise. For example, when a transaction is submitted to the ledger, is not anchored immediately. Thus, a malicious actor may intercept the submission and modify it before anchoring. Additionally, while distributed ledgers are extremely difficult to modify, modification is not impossible. Furthermore, from a practical perspective, the transaction costs for the ledger may be high, making anchoring after every transaction impractical.

Various embodiments address these concerns by providing multiple points of verification. One or more consistency checks are performed based on local representations of the data (meaning representations not appended to a distributed ledger) for all (or a substantial portion of) transactions, with a cryptographically verifiable reduced representation of the data being periodically appended to the ledger (e.g., daily or hourly, or after a given number of transactions). Consequently, the data may be validated against the locally stored representations, which may in turn be validated against the reduced representations anchored to the ledger. Thus, a high degree of confidence that the data has not been tampered with can be achieved as the likelihood that malicious actors successfully mask their actions at every point of verification is substantially lower relative the likelihood of any one of the verification checks alone being circumvented.

Example Data Verification System

Figure 1:
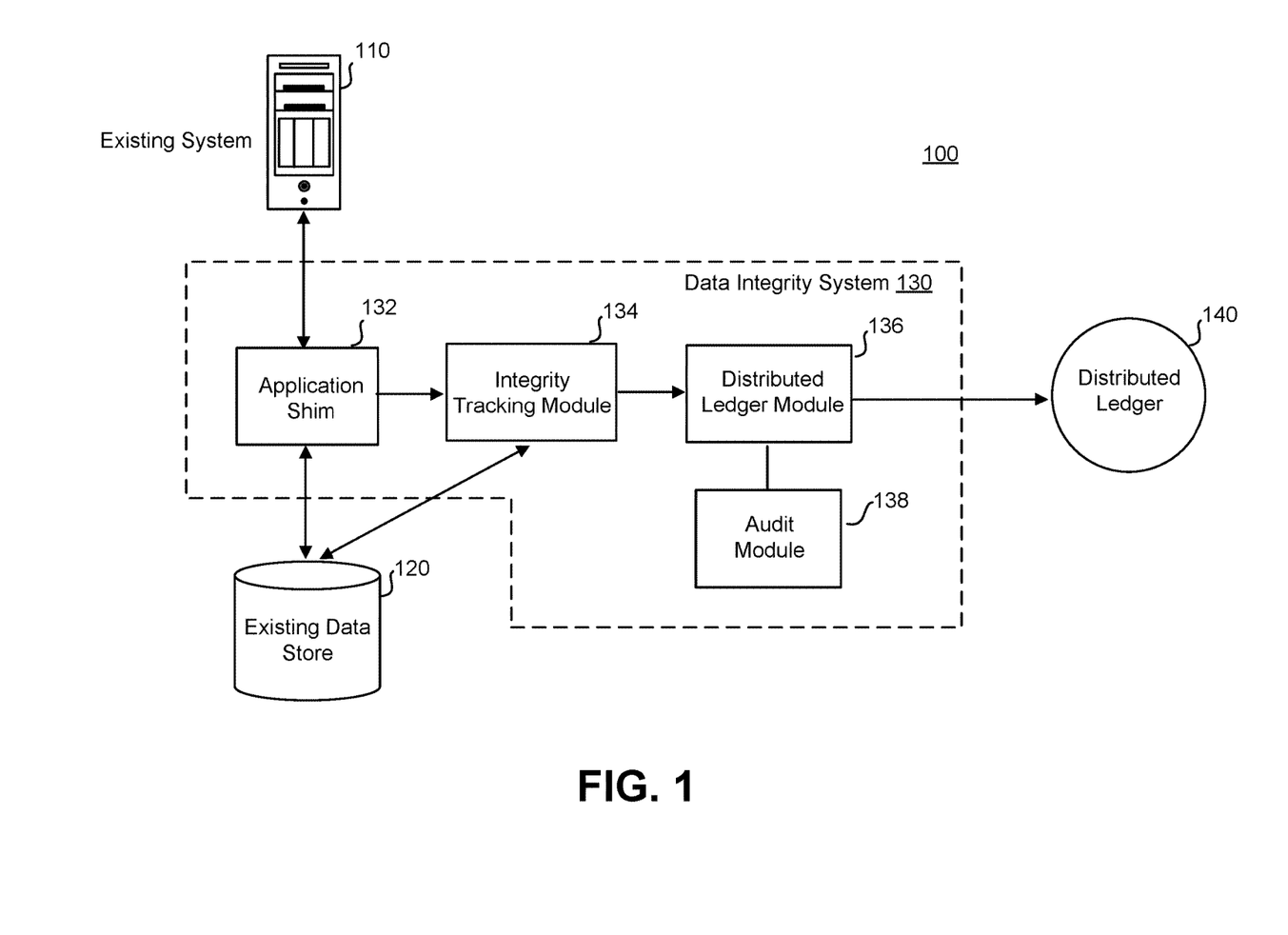
FIG. 1 illustrates an example networked computing environment in which proof of non-tampering with data may be provided, according to one embodiment.

FIG. 1 illustrates an example embodiment of a networked computing environment 100 in which proof of non-tampering with data may be provided. In the embodiment shown, the networked computing environment 100 includes an existing system 110 (e.g., an application server), an existing data store 120, a data integrity system 130, and a distributed database or ledger 140. In other embodiments, the networked computing environment 100 may include different and/or additional elements. In addition, the functions may be distributed among the elements in a different manner than described.

The existing system 110 is one or more computing devices that generate or modify data for which proof of non-tampering is desirable. For example, the computing devices may be desktop computers, laptop computers, servers, mainframes, tablets, smartphones, or the like. In one embodiment, the existing system 110 may be a laboratory computer that controls one or more instruments to generate pharmacology data that will be submitted to a regulator.

The data is stored in the existing data store 120 (e.g., a database). The existing data store 120 includes one or more computer readable media configured to store the data. In FIG. 1, the existing data store 120 is shown as a separate component from the existing system 110, connected via a network. However, the existing data store 120 may also be part of the existing system 110 (e.g., a hard drive). Furthermore, although the existing data store 120 is shown as a single entity, it may be distributed across several computing devices that are connected via a network. In one embodiment, the existing data store 120 provides change-data-capture (CDC) functionality that provides a history of changes made to the data. Although the term CDC is used for convenience, other forms of change tracking, such as a capture stream, may be used. The term CDC should be understood to include these other forms of change tracking unless otherwise apparent from the context. In another embodiment, CDC functionality may not be available (e.g., for technical, business, or regulatory reasons).

In conventional configurations, nefarious actors may modify the data and cover their tracks (e.g., by modifying database log files as well as the data). Such acts can be difficult to detect and, as noted previously, the impact can be substantial. The data integrity system 130 monitors authorized transactions with the existing data store 120 and maintains a reduced representation of the data. The reduced representation may be a Merkle tree, one or more hash values, one or more checksums, or the like. If a discrepancy arises between the reduced representation and the stored data, this may indicate that a malicious actor has tampered with the data.

In the embodiment shown, in FIG. 1, the data integrity system 130 includes an application shim 132, an integrity tracking module 134, a distributed ledger module 136 and an audit module 138. In other embodiments, the data integrity system 130 may include different and/or additional elements. In addition, the functions may be distributed among the elements in a different manner than described.

Legacy and commercial systems may not provide data integrity tracking natively. In one embodiment, instead of making substantial modifications to these systems, an application shim 132 may be located between the existing system 110 and the existing data store 120. The application shim 132 acts as a proxy, with transactions between the existing system 110 and the existing data store 120 passing through the shim. If a transaction may change the data (e.g., requests to add, edit, or delete records), the shim 132 may send a copy of the transaction (or the relevant portion thereof) to the integrity tracking module 134 and passes the original transaction on to the existing data store 120. Conversely, if the transaction will not change the data (e.g., a read request), then the shim 132 may not make a copy and allow the transaction to pass to the existing data store 120. Various embodiments of the shim 132 are described in greater detail below, with reference to FIG. 2.

The integrity tracking module 134 maintains the reduced representation of the data in the existing data store 120. In one embodiment, when a new transaction that will update the data is received, the integrity tracking module 134 compares the data to the reduced representation to determine whether any unauthorized changes have been made. If no unauthorized changes are detected, the transaction is validated and the reduced representation is updated. The integrity tracking module 134 may also notify the distributed ledger module 136 of the update to the reduced representation.

If an unauthorized modification to the data has occurred, the integrity tracking module 134 may notify the appropriate entity (e.g., a security officer, a systems administrator, or the like). The integrity tracking module 134 may also prevent further changes to the existing data store 120 and/or trigger restoration of an earlier version of the data from a backup. Various embodiments of the integrity tracking module 134 are described in greater detail below, with reference to FIG. 3.

The distributed ledger module 136 periodically (e.g., hourly, daily, every 100 transactions, etc.) appends some or all of the reduced representation to a distributed database or ledger (e.g., a blockchain) for future auditing. This period may be configurable. In one embodiment, the reduced representation is a Merkle tree. When an append operation is triggered (e.g., after the designated amount of time or number of transactions), the distributed ledger module 136 verifies that the reported changes due to transactions match which nodes the integrity tracking module 134 reports have been changed. If there is a mismatch, this indicates an integrity issue and corrective action may be taken (e.g., notifying the appropriate entity, preventing further changes to the data, initiating data restoration from a backup, and the like).

Because the process may be asynchronous, there may have been additional transactions that impact the Merkle tree since the append operation was triggered. Consequently, in one embodiment, the distributed ledger module 136 uses the timestamp of the most last transaction received before the append operation was triggered to query the integrity tracking module 134 for any changes to the data since that transaction. The distributed ledger module 136 may then verify that the only changes to the Merkle tree since the append operation was triggered correspond to authorized transactions submitted after the time indicated by the timestamp. If additional changes have been made, this indicates an integrity issue and corrective action may be taken. Conversely, if no data integrity issues are identified, the root hash of the Merkle tree may be appended to the distributed ledger. Alternatively, a node hash (block), leaf hash (row) or a larger portion of the Merkle tree, the whole tree, or some other cryptographically verifiable representation of the data may be appended to distributed ledger.

In one embodiment, the distributed ledger module 136 may use a unique address for each system or application. This can increase efficiency as searching a large distributed ledger for a particular entry can be time consuming. By using a unique address, the search space can be reduced. Alternatively, the distributed ledger module 136 may serve multiple systems and/or applications and use a single address for all of the systems and/or applications it serves.

The audit module 138 checks the integrity of data stored in the existing data store 120. An integrity check can be triggered periodically (e.g., at fixed time intervals) or manually triggered by a user. In some embodiments, where the existing data store 120 tracks the history of the data, the user can manually trigger an integrity check and specify a point of time in the past for which the integrity of the data at the time should be audited.

In one embodiment, the audit module 138 uses a specified time (e.g., the time of triggering or a time provided by the user) and queries the existing data store 120 for the data. If the specified time is earlier than the current time, the audit module 138 (or the existing data store 12) may reconstruct the state of the data at the time (e.g., based on change logs). The audit module 138 retrieves the Merkle tree (e.g., from the data integrity module 134) and checks that there are no pending updates to the tree (e.g., transactions that are timestamped before the specified time but for which the Merkle tree has not yet been updated). If the Merkle tree has been modified more recently than the specified time, the audit module 138 may recalculate it based on a history stored in the nodes such that the Merkle tree is in the state that it was at the specified time. Additionally or alternatively, multiple iterations of the Merkle tree may be stored in a cache to improve speed or performance (e.g., by removing the need for the tree to be recalculated).

The audit module 138 compares the retrieved Merkle tree to the data and the distributed ledger. A new Merkle tree generated from the data should match the stored Merkle tree and the Merkle tree should match what was appended to the blockchain at the specified time (once transactions that occurred between the last append operation and the specified time are accounted for). Because the distributed ledger is exceedingly difficult to modify, if the stored Merkle tree matches with both the data and the distributed ledger, a great degree of confidence can be placed in the conclusion that the data has not been tampered with. Conversely, if either does not match, this suggests an unauthorized change to the data and corrective action may be taken. The audit process is described in greater detail below, with reference to FIG. 8.

As described above, the distributed ledger 140 provides a mechanism to verify that the reduced representation stored by the data integrity system 130 has not been tampered with. In one embodiment, the distributed ledger 140 may be a blockchain and the reduced representation is a Merkle tree, and the integrity tracking module 134 periodically appends the root hash of the Merkle tree to the blockchain. In other embodiments, other types of distributed ledger or database are used to provide confirmation that the reduced representation has not been subject to unauthorized modification.

The components of the networked computing environment 100 may communicate via a network (not shown). The network can include any combination of local area and/or wide area networks, using both wired and/or wireless communication systems. In one embodiment, the network uses standard communications technologies and/or protocols. For example, the network can include communication links using technologies such as Ethernet, 802.11, worldwide interoperability for microwave access (WiMAX), 3G, 4G, 5G, code division multiple access (CDMA), digital subscriber line (DSL), etc. Examples of networking protocols used for communicating via the network include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network may be represented using any suitable format, such as hypertext markup language (HTML) or extensible markup language (XML). In some embodiments, all or some of the communication links of the network 170 may be encrypted using any suitable technique or techniques.

Figure 2:
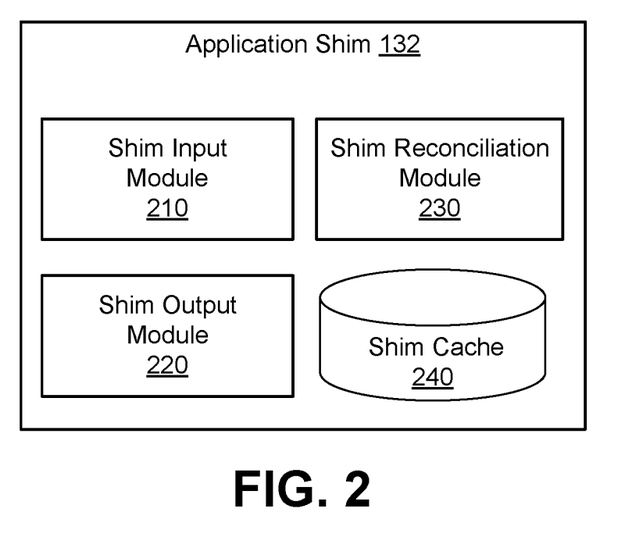
FIG. 2 illustrates an application shim configured for use in the networked computing environment of FIG. 1, according to one embodiment.

FIG. 2 illustrates an embodiment of an application shim 132 configured to act as a proxy between an existing system 110 and an existing data store 120. In the embodiment shown in FIG. 2, the application shim 132 includes a shim input module 210, a shim output module 220, a shim reconciliation module 230, and a shim cache 240. In other embodiments, the application shim 132 may include different and/or additional elements. In addition, the functions may be distributed among the elements in a different manner than described.

Transactions sent between the existing application 110 and the existing data store 120 pass through the shim input module 210. The precise position of the shim input module 210 in the data path may depend on the specific architecture of the existing system 110 and/or existing data store 120. In one embodiment, the existing data store 120 is a database and the shim input module 210 includes a database driver that emulates an existing application programming interface (API) of the existing database 120. Thus, the existing application 110 interacts with the shim input module 210 in the same manner that it would interact with the database 120 if the shim 132 was not present.

In another embodiment, the shim input module 210 includes an application API component that emulates an API of the existing application 110 (e.g., a RESTful, SOAP, or other API architecture). The existing application 110 may interact with the application API component in the manner it would normally interact with the application API. In a further embodiment, the shim input module 210 includes a filesystem component. The existing application 110 interacts with the filesystem as usual and the filesystem directs transaction via the shim 132 rather than directly between the existing system 110 and existing data store 120. In other embodiments, the shim input module 210 uses other approaches to transparently intercept transactions. For example, a plugin extension to the existing application 110 and/or existing data store 120 may be used.

The shim output module 220 inspects transactions (e.g., received from the existing system 110) and determines where to send them. In one embodiment, the shim output module 220 may inspect each transaction and if the transaction may change the data in the existing data store 120 (e.g., a new record, a record deletion, or record update), then the shim input module 210 makes a copy (e.g., in the shim cache 240) and sends the copy to the integrity tracking module 134. Regardless of whether the transaction may change the data, the shim output module 220 sends it on to the original destination (e.g., the existing data store 220).

The shim reconciliation module 230 checks for unauthorized changes to the data that were made by bypassing the shim 132. In one embodiment, after the integrity tracking module 134 has verified that a transaction is consistent with the data in the existing data store 120 (described below, with reference to FIG. 3), the shim reconciliation module 230 checks that the transaction matches what was stored in the shim cache 240.

The shim cache 240 includes one or more computer-readable media configured to store copies of transactions between the existing application 110 and the existing data store 120. In one embodiment, the transactions are stored in random access memory (RAM) of the computing device that executes the shim 132. Alternatively or additionally, the copies of the transactions may be stored in flash memory, on a hard drive, or the like.

Figure 3:
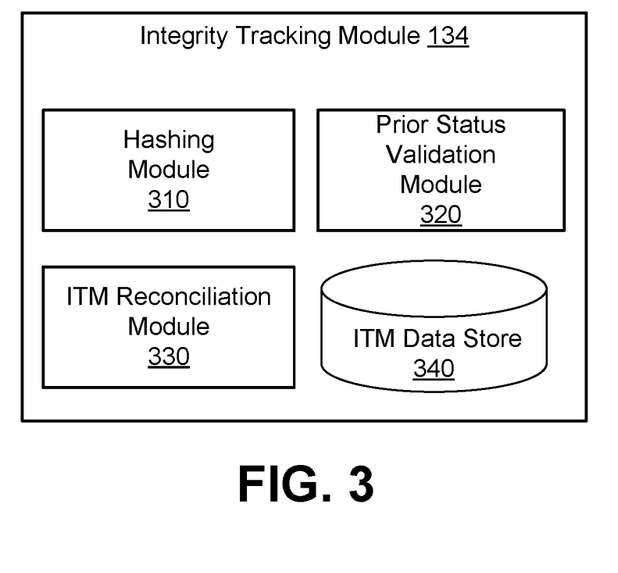
FIG. 3 illustrates an integrity tracking module configured for use in the networked computing environment of FIG. 1, according to one embodiment.

FIG. 3 illustrates one embodiment of an integrity tracking module 134 configured for validating the data in the existing data store 120 has not been tampered with. In the embodiment shown, the integrity tracking module 134 includes a hashing module 310, a prior status validation module 320, an integrity tracking module (ITM) reconciliation module 330, and an ITM data store 340. In other embodiments, the integrity tracking module 134 may include different and/or additional elements. In addition, the functions may be distributed among the elements in a different manner than described.

The hashing module 310 maintains a reduced representation of some or all of the data in the existing data store 120 (e.g., in the ITM data store 340). Although the reduced representation is generally referred to as a hash herein, other reduced representations may be used (e.g., one or more checksums). In one embodiment, the reduced representation is a Merkle tree that represents a database or table within a database that is stored in the existing data store 120. The hashing module 310 receives a copy of a transaction that modifies or adds a row. The resulting row is hashed and the hash value is added to the corresponding leaf node of the Merkle tree (e.g., a leaf node representing the updated row or a new leaf node if the transaction added a new row). Any nodes that are higher in the Merkle tree and are affected by the leaf node, including the root node, are also recalculated.

Figure 4:
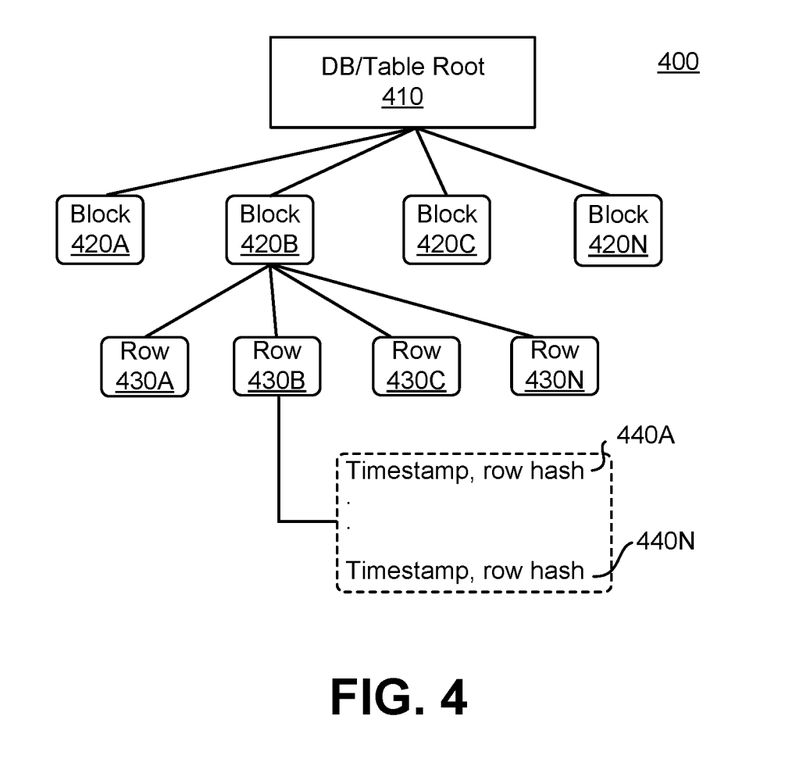
FIG. 4 illustrates a Merkle tree, according to one embodiment.

FIG. 4 illustrates one embodiment of a Merkle tree 400 that may be used by the hashing module 310. The Merkle tree 400 shown has a root node 410 that corresponds to the entire database or table represented by the tree. Branching off the root node 410 are several block nodes 420A-N, each corresponding to a block within the database or table. Although four block nodes 420A-N are shown, the Merkle tree 400 may include any number of block nodes. Each block node 420A-N has several leaf nodes branching off it (e.g., row nodes 430A-N that branch off block node 420B). Although four leaf nodes 430A-N are shown, each block node 430A-N may branch into any number of leaf nodes. Furthermore, while only block node 420B is shown as having leaf nodes branching off it, in practice, each block node may branch into several leaf nodes.

In the embodiment shown in FIG. 4, leaf node 430B includes a set of timestamp/hash pairs 440A-N relating to the content of the row that corresponds to the lead node. The timestamp in a pair indicates the time of a transaction that modified (or added) the row. In a system using CDC, the timestamp used can be the time reported by the CDC transaction. If CDC is not being used, the timestamp associated with the update being stored in the existing data store 120 may be used. Alternatively, a timestamp generated by the application that originally generated the transaction or one generated by the shim 132 may be used. The hash in the pair is the reduced representation of the corresponding row as modified (or created) by the transaction at the time indicated by the timestamp. The leaf node 430B may include a timestamp/hash pair for every transaction that modified the row. Thus, timestamp/hash pair 440A may correspond to the transaction that added the row to the existing database 120 and timestamp/hash pair 440N may correspond to the most recent modification to the row.

Alternatively, the leaf node 430B may include timestamp/ hash pairs 440A-N for a predetermined number (e.g., one, then, one hundred, etc.) of the most recent transactions that affected the row. Similarly, the timestamp/hash pairs 440A-N might be stored for transactions within a predefined time period (e.g., the last week, month, year, etc.). The number of transaction/hash pairs stored in a node may be configurable. Although FIG. 4 only shows timestamp/hash pairs 440A-N for leaf node 430B, each leaf node 430A-N may include one or more such pairs.

The content of block nodes 420A-N and root node 410 are generated from the leaf nodes beneath them in the Merkle tree 400. For example, the block node 420B is updated based on the leaf nodes 430A-N. In one embodiment, the hashing module 310 generates values for each block node 420A-N by concatenating the timestamp/hash pairs stored in the corresponding leaf nodes (e.g., leaf node 430A-N) and then hashing the result. Like the leaf nodes 430A-N, the block nodes 420A-N may include a set of one or more timestamp/ hash pairs. Similarly, the root node 410 may be updated by concatenating the timestamp/hash pairs in the block node 420A-N, hashing the result, and storing the resulting hash along with a timestamp in the root node 410.

Referring back to FIG. 3, the prior status validation module 320 checks that a row that will be updated by a transaction has not been subject to an unauthorized modification prior to the current transaction. In various embodiments, the prior status validation module 320 hashes the original row in the existing data store 120 (e.g., the row as it was prior to being updated by the transaction) and compares the result to the hash for the row stored in the reduced representation maintained by the hashing module 310. If the row has subject to an unauthorized modification, the hashes will not match and the prior status validation module 320 initiates appropriate corrective action (e.g., notifying appropriate entities, blocking further transactions, initiating a restore operation from a backup, etc.).

In one embodiment, the prior status validation module 320 processes the transaction asynchronously, meaning that the transaction (and potentially additional transactions) may modify the existing data store 120 before being validated. To account for this, the prior status validation module 320 may use the CDC functionality of the existing data store (where available) to back out each transaction up to the current transaction that impacted the row modified by the current transaction and recover the status of that row prior to the current transaction. The recovered row can then be hashed and compared to the stored reduced representation. Alternatively, if CDC functionality is unavailable or using it is undesirable, any row impacted by a transaction may be locked, meaning no changes may be made to it, until the transaction has been validated by the prior status validation module 320.

The ITM reconciliation module 330 checks that any transactions that were accounted for by the prior status validation module 320 (e.g., by backing them out) match those that went through the shim 132. In one embodiment, the ITM reconciliation module 330 notifies the shim reconciliation module 230 of the transactions accounted for by the prior status validation module 320 with regard to the current transaction. The shim reconciliation module 230 then reconciles this with the transactions stored in the shim cache 240 (e.g., as described previously with reference to FIG. 2). If the transactions stored in the shim cache 240 do not match those accounted for by the prior status validation module 320, there is an integrity issue. Consequently, the ITM reconciliation module 330 takes appropriate corrective action (e.g., notifying appropriate entities, blocking further transactions, initiating a restore operation from a backup, etc.). Conversely, if no data integrity issue is identified, the ITM reconciliation module 330 may notify the hashing module 310 and the Merkle tree may be updated to reflect the status of the data as modified by the current transaction.

The ITM data store 340 includes one or more computer-readable media configured to store the reduced representation of the data in the existing data store 120 generated by the hashing module 310. In one embodiment, the reduced representation is stored on a hard drive of a computer system that executes the integrity tracking module 134. Alternatively or additionally, the reduced representation may be stored in other types of computer-readable media, such as flash memory.

Example Machine Architecture

Figure 5:
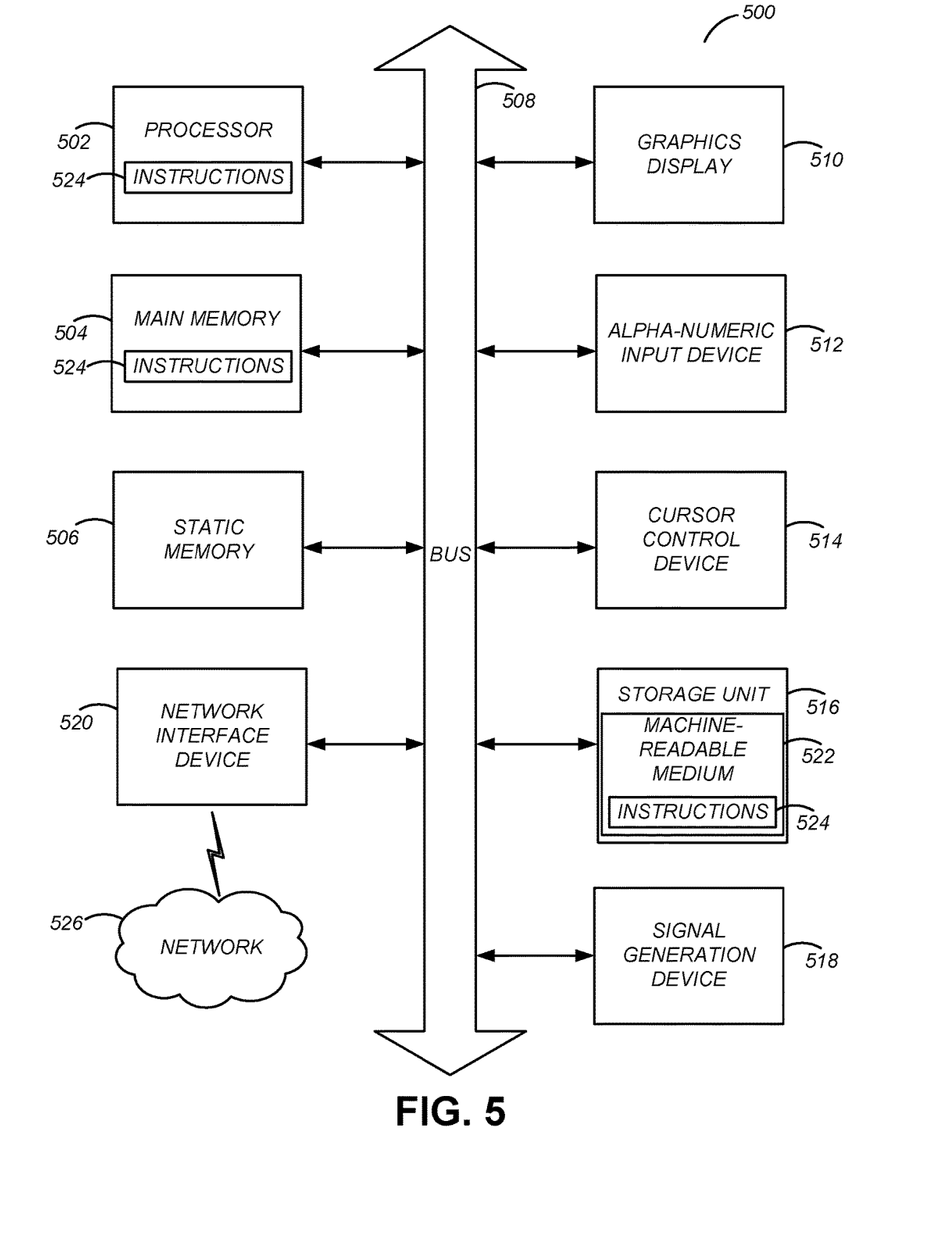
FIG. 5 is a block diagram illustrating components of an example machine able to read instructions from a machine-readable medium and execute them in a processor (or controller), according to one embodiment.

FIG. 5 is a block diagram illustrating components of an example machine able to read instructions from a machine-readable medium and execute them in a processor (or controller). Specifically, FIG. 5 shows a diagrammatic representation of a machine in the example form of a computer system 500. The computer system 500 can be used to execute instructions 524 (e.g., program code or software) for causing the machine to perform any one or more of the methodologies (or processes) described herein, including those associated, and described, with the components (or modules) of the existing system 110, data store 120, and/or data integrity system 130. In alternative embodiments, the machine operates as a standalone device or a connected (e.g., networked) device that connects to other machines. In a networked deployment, the machine may operate in the capacity of a server machine or a client machine in a server-client network environment, or as a peer machine in a peer-to-peer (or distributed) network environment.

The machine may be a server computer, a client computer, a personal computer (PC), a tablet PC, a set-top box (STB), a smartphone, an internet of things (IoT) appliance, a network router, switch or bridge, or any machine capable of executing instructions 524 (sequential or otherwise) that specify actions to be taken by that machine. Further, while only a single machine is illustrated, the term "machine" shall also be taken to include any collection of machines that individually or jointly execute instructions 524 to perform any one or more of the methodologies discussed herein.

The example computer system 500 includes one or more processing units (generally one or more processors 502). The processor 502 is, for example, a central processing unit (CPU), a graphics processing unit (GPU), a digital signal processor (DSP), a controller, a state machine, one or more application specific integrated circuits (ASICs), one or more radio-frequency integrated circuits (RFICs), or any combination of these. Any reference herein to a processor 502 may refer to a single processor or multiple processors. The computer system 500 also includes a main memory 504. The computer system may include a storage unit 516. The processor 502, memory 504, and the storage unit 516 communicate via a bus 508.

In addition, the computer system 500 can include a static memory 506, a display driver 510 (e.g., to drive a plasma display panel (PDP), a liquid crystal display (LCD), or a projector). The computer system 500 may also include alphanumeric input device 512 (e.g., a keyboard), a cursor control device 514 (e.g., a mouse, a trackball, a joystick, a motion sensor, or other pointing instrument), a signal generation device 518 (e.g., a speaker), and a network interface device 520, which also are configured to communicate via the bus 508.

The storage unit 516 includes a machine-readable medium 522 on which is stored instructions 524 (e.g., software) embodying any one or more of the methodologies or functions described herein. The instructions 524 may also reside, completely or at least partially, within the main memory 504 or within the processor 502 (e.g., within a processor's cache memory) during execution thereof by the computer system 500, the main memory 504 and the processor 502 also constituting machine-readable media. The instructions 524 may be transmitted or received over a network 570 via the network interface device 520.

While machine-readable medium 522 is shown in an example embodiment to be a single medium, the term "machine-readable medium" should be taken to include a single medium or multiple media (e.g., a centralized or distributed database, or associated caches and servers) able to store the instructions 524. The term "machine-readable medium" shall also be taken to include any medium that is capable of storing instructions 524 for execution by the machine and that cause the machine to perform any one or more of the methodologies disclosed herein. The term "machine-readable medium" includes, but not be limited to, data repositories in the form of solid-state memories, optical media, and magnetic media.

Example Methods for Providing Proof of Non-Tampering with Data

Figure 6:
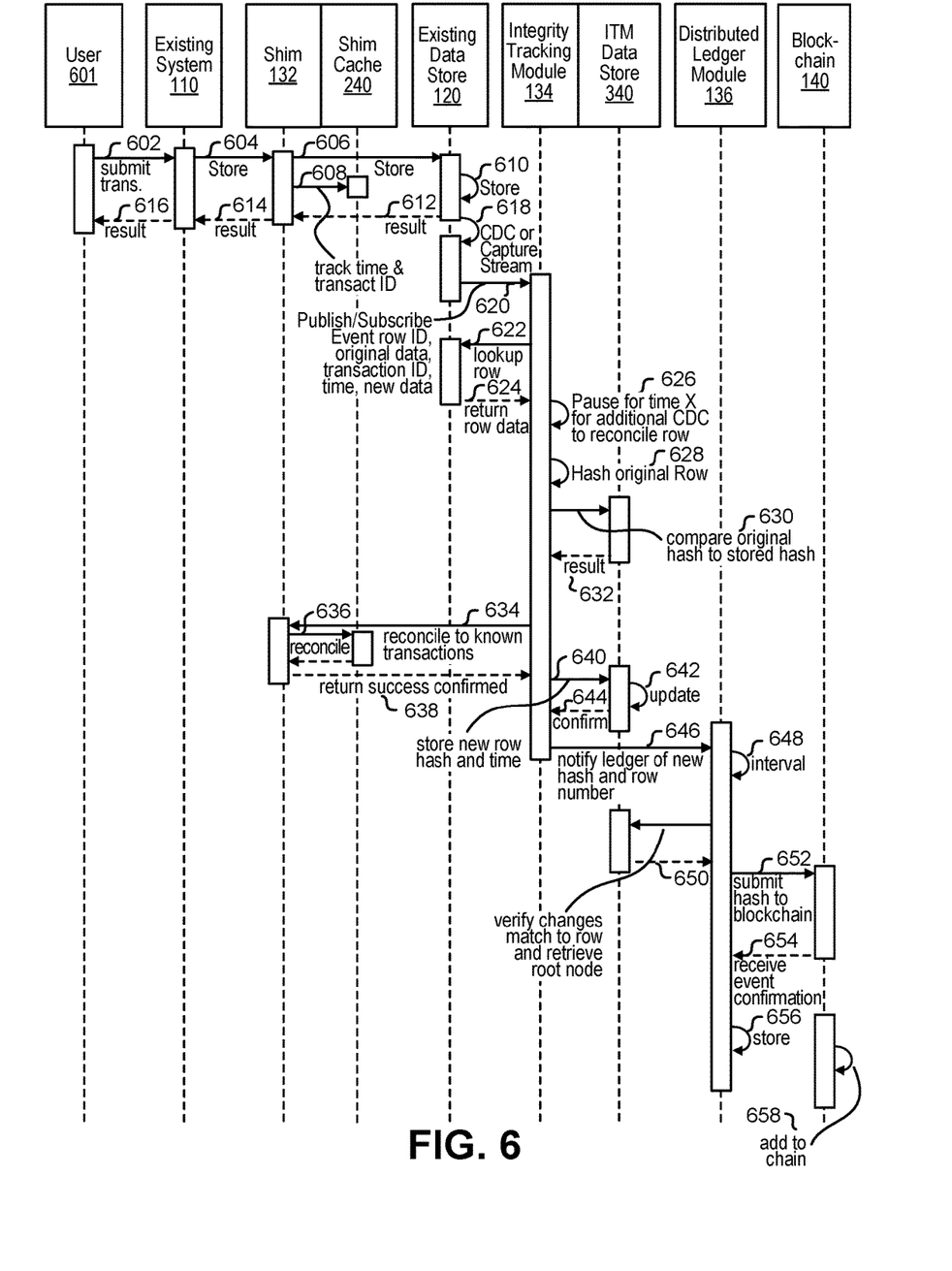
FIG. 6 is an event trace for verifying data has not been tampered with as part of an update transaction using change-data-capture, according to one embodiment.

FIG. 6 illustrates one embodiment of a method for verifying data has not been tampered with using CDC functionality. The operations in FIG. 6 are shown as being performed by various entities and/or components and may be executed on a machine such as one having some or all of the components of computer system 500. However, some or all of the operations may be performed by other entities and/or components. In addition, some embodiments may perform certain operations in parallel, perform the operations in different orders, and/or perform different operations.

In the embodiment shown in FIG. 6, the method begins with a user 601 submitting 602 a transaction to an existing system 110. The existing application 110 sends 604 transaction to a shim 132. Assuming the transaction will update data stored in an existing data store 120, the shim 132 forwards 606 the transaction to the existing data store 120 and stores 608 a copy of the transaction in a shim cache 240. The cached copy may include the time of the transaction and a transaction ID. The existing data store 120 stores 610 the transaction (e.g., by updating the indicated rows) and returns 612 a result (e.g., an acknowledgement that the transaction was successful) to the shim 132. The shim passes 614 the result on to the existing system 110, which may report 616 the result to the user 601.

The CDC of the existing data store 120 records 618 the change made by the transaction and publishes 620 information about the change to the integrity tracking module 134. In one embodiment, the integrity tracking module 134 is subscribed to the CDC and the information published 620 includes an identifier of a row that was changed (.g., a row ID number), the original data in that row, an identifier of the transaction (e.g., a transaction ID number), a timestamp of the transaction, and the new data for the row. The integrity tracking module 134 may use the received information from the CDC to look up 622 and receive 624 the corresponding row data in the existing data store 120.

Where a high rate of transactions is observed or anticipated, the integrity tracking module 134 may pause 626 before proceeding to receive additional publications from the CDC. In one embodiment, the pause 626 is for a configurable period of time. After the pause 626, the integrity tracking module 134 reconciles the row retrieved 624 with information published 620 that corresponds to that row (e.g., consecutively, in chronological order) until a CDC transaction is identified that either matches the row data or includes changes not reflected in the retrieved row. To determine the original data in the row, the integrity tracking module 134 may back out each transaction that modified the row with a timestamp after the identified transaction. Thus, the integrity tracking module 134 can account for changes to the data that it has not yet processed.

The integrity tracking module 134 hashes 628 the original row data to generate an original row hash. The integrity tracking module 134 compares 630 the original row hash to the corresponding hash in the ITM data store 340. In one embodiment, the ITM data store 340 includes a Merkle tree and the integrity tracking module 134 compares 630 the original row hash to the most recent hash stored in the Merkle tree in a leaf node corresponding to the row. The ITM data store 340 returns 632 the result to the comparison 630. Alternatively, the integrity tracking module 134 may request the latest hash for the row in question, which the ITM data store 340 returns, and the comparison is performed by another entity (e.g., the prior status validation module 320).

Regardless of how the comparison 630 is performed, the integrity tracking module 134 sends (or transmits) 634 the result along with information regarding any transactions that were accounted for (e.g., by backing them out) to the application shim 132. In one embodiment, if the result indicates that the original row hash did not match the corresponding hash in the ITM data store 340, there is a data integrity issue. Consequently, the shim 132 may take corrective action, as described previously. If the hashes did match, the shim 132 reconciles 636 the transactions accounted for with those included in the shim cache 240. If the integrity tracking module 134 accounted for transactions that are not in the shim cache 240, this indicates a data integrity issue (e.g., a transaction may have been submitted bypassing the shim 132). Accordingly, the shim 132 may take corrective action. Conversely, if the reconciliation is successful (all accounted for transactions also appear in the shim cache 240), the shim 132 returns 638 a reconciliation success confirmation to the integrity tracking module 134.

The integrity tracking module 134 sends 640 a hash of the updated row to the ITM data store 340. In one embodiment, the ITM data store 340 includes a Merkle tree. The hash of the updated row is added to the corresponding leaf node and impacted nodes higher the hierarchy of the tree are updated 642 (e.g., by recalculating the corresponding block node and the root node). The use of a Merkle tree may be efficient in this context because only those nodes at higher levels that have at least one child node updated need to be rehashed. Alternatively, more of the Merkle tree (e.g., all of it) may be recalculated each time a node is updated. The ITM data store 240 may send 644 confirmation that the Merkle tree was successfully updated to the integrity tracking module 134 along with an indicator of the transaction and row updated (e.g., a transaction ID and a row ID). The integrity tracking module 134 may send 646 a notification of the update (e.g., the transaction ID and row ID) to the distributed ledger module 136.

At a configurable interval 648, the distributed ledger module 136 queries the ITM data store 340 to verify 650 the received transactions. The configurable interval 648 may be set based on time, a number of transactions received, and/or any other relevant factors. In one embodiment, the distributed ledger module 136 verifies 650 the received transactions by checking that each received transaction matches what is stored in the ITM data store 340. If a mismatch is detected, this indicates an integrity issue and corrective action may be taken. Conversely, if the transactions match, the distributed ledger module 136 verifies that the only changes made in the ITM data store 340 between the last time a hash was appended to the distributed ledger and the timestamp of the most recent matching transaction correspond to the matching transactions. Assuming these are the only changes, the distributed ledger module 136 obtains 650 the root hash of the Merkle tree (recalculating some or all of the tree if necessary). Alternatively, a greater amount of Merkle tree may be obtained 650 (e.g., the entire tree).

The distributed ledger module 136 submits 652 the hash (or hashes) to a distributed ledger 140. In one embodiment, the distributed ledger module 135 submits 652 the root hash of the Merkle tree to be appended to a blockchain 140. The blockchain 140 may return 654 an event receipt confirming the request, which the distributed ledger module 136 may store 656. The hash will eventually be added 658 to the blockchain 140, but this may take some time (e.g., if demand is high and/or the transaction price offered is low). The event receipt can later be used to locate the particular hash on the blockchain 140 for verification purposes. This is described in greater detail below, with reference to FIG. 8.

Figure 7:
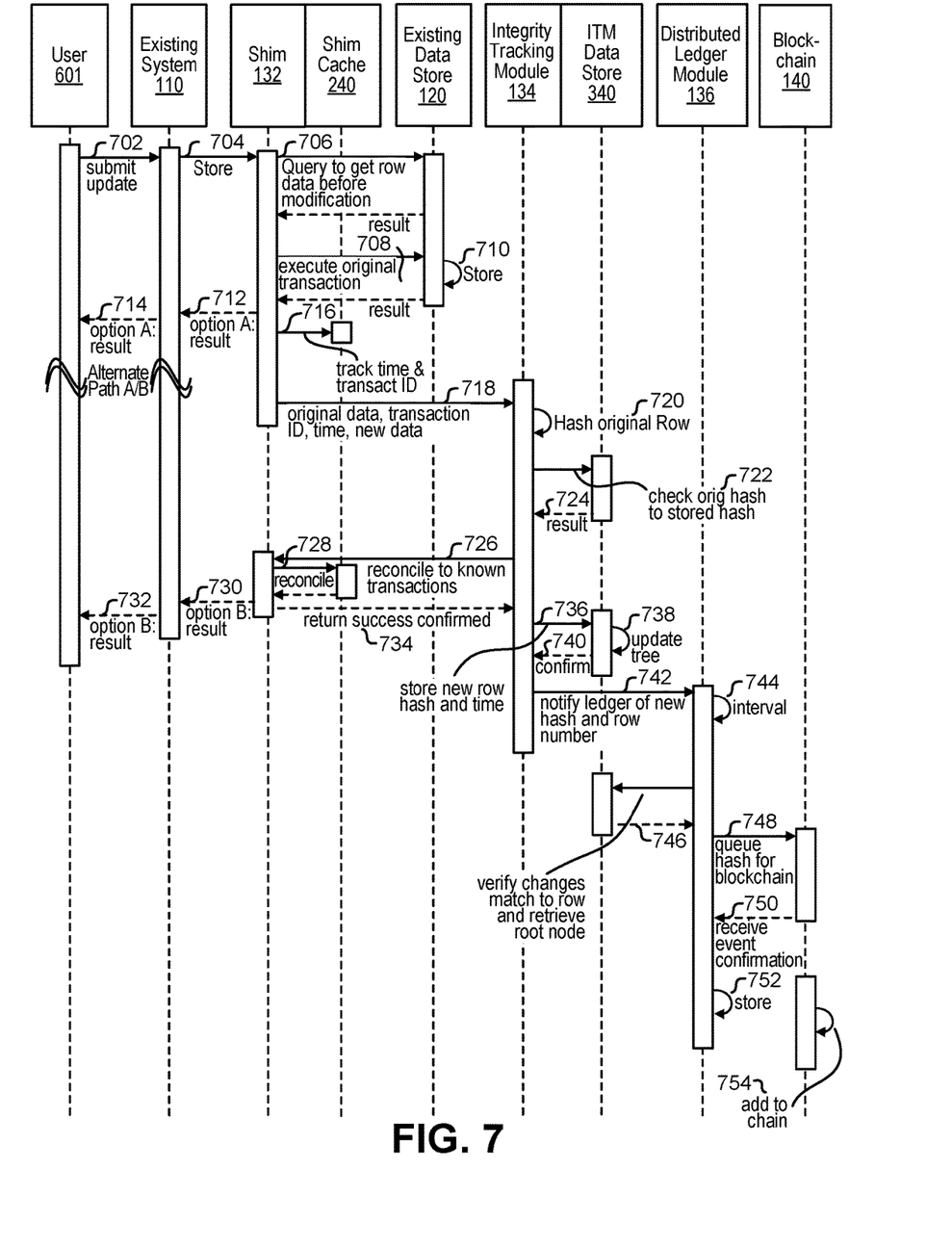
FIG. 7 is an event trace for verifying data has not been tampered with as part of an update transaction without using change-data-capture, according to one embodiment.

FIG. 7 illustrates one embodiment of a method for verifying data has not been tampered with without using CDC functionality. The operations in FIG. 7 are shown as being performed by various entities and/or components and may be performed by a machine have some or all of the components of computer system 500. However, some or all of the operations may be performed by other entities and/or components. In addition, some embodiments may perform certain operations in parallel, perform the operations in different orders, and/or perform different operations.

In the embodiment shown in FIG. 7, the method begins with a user 601 submitting 702 an update to an existing system 110. The existing system 110 sends 704 a transaction that identifies the update to be made (e.g., an addition, modification, or deletion of a row) to a shim 132. To prevent other transactions from modifying the data before the validation process is complete, the shim 132 may lock the row (or rows) impacted by the transaction. The shim 132 queries 706 the existing data store 120 to retrieve the original row data and executes 708 the transaction, causing the corresponding rows in the existing data store 120 to be updated 710. Once the existing data store has been updated 710 with the new row data, the shim 132 may unlock the corresponding rows.

If asynchronous integrity checking is acceptable, the shim 132 may notify 712 the existing system 110 that the update has been applied, and the existing system 110 can in turn display 714 the result to the user 601 (labelled option A). Alternatively, if synchronous integrity checking is desired, these operations may be performed later in the process (labelled option B). Regardless of whether the shim 132 notifies 712 the existing system 110 that the update has been applied, a copy of the transaction (e.g., including the transaction time and transaction ID) is stored 716 in the shim cache 240.

The shim 132 sends 718 information about the transaction to the integrity tracking module 134. In one embodiment, the information includes the original row data, the transaction ID, the time of the transaction, and the new row data. The integrity tracking module 134 hashes 720 the original row data and compares 722 the resulting hash to the stored hash for that row in the ITM data store 340. If the result 724 indicates that the hashes do not match, this indicates a data integrity issue and corrective action may be taken.

The integrity tracking module 134 sends 726 the result to the shim 132, which reconciles 728 the transaction with the shim cache 240. This may be done in a similar manner as described above with reference to elements 634 and 636 of FIG. 6. If a mismatch is identified, this indicates a data integrity issue and corrective action may be taken. If reconciliation 728 is successful, the shim 132 may notify 734 the integrity tracking module 134. In addition, if synchronous integrity checking is desired (e.g., option A was not used), then the shim 132 also returns 730 the result to the existing system 110, which may in turn present 732 it to the user 601 (labelled option B).

From here, the method may proceed in a similar manner as described above, with reference to FIG. 6. In the embodiment shown in FIG. 7, the integrity tracking module 134 sends 736 a hash of the new row data and the corresponding time to the ITM data store 340, which updates 738 the Merkle tree and returns 740 confirmation of the update. The integrity tracking module 134 notifies 742 the distributed ledger module 136 of the new hash and the corresponding row number.

The distributed ledger module 136 may pause 744 for a configurable interval (e.g., based on time, number of transactions, etc.) and verify 746 that the transactions match what is in the ITM data store 340. If the transactions do not match, this indicates a data integrity issue and appropriate corrective action may be taken. If the transactions do match, the distributed ledger module may retrieve the root node (or a larger portion) of the Merkle tree. The root node (or larger portion) of the Merkle tree can then be appended to the distributed ledger 140 (e.g., a blockchain).

In the embodiment shown in FIG. 7, the distributed ledger module 136 appends the root node by sending 748 it to a blockchain 140 to be queued. Eventually, the root node will be added 754 to the blockchain 140. The blockchain 140 returns 750 an event confirmation that the distributed ledger module 136 stores 752. The event confirmation can be used to identify the hash on the blockchain 140 for later user (e.g., as part of an audit, as described below with reference to FIG. 8).

Figure 8:
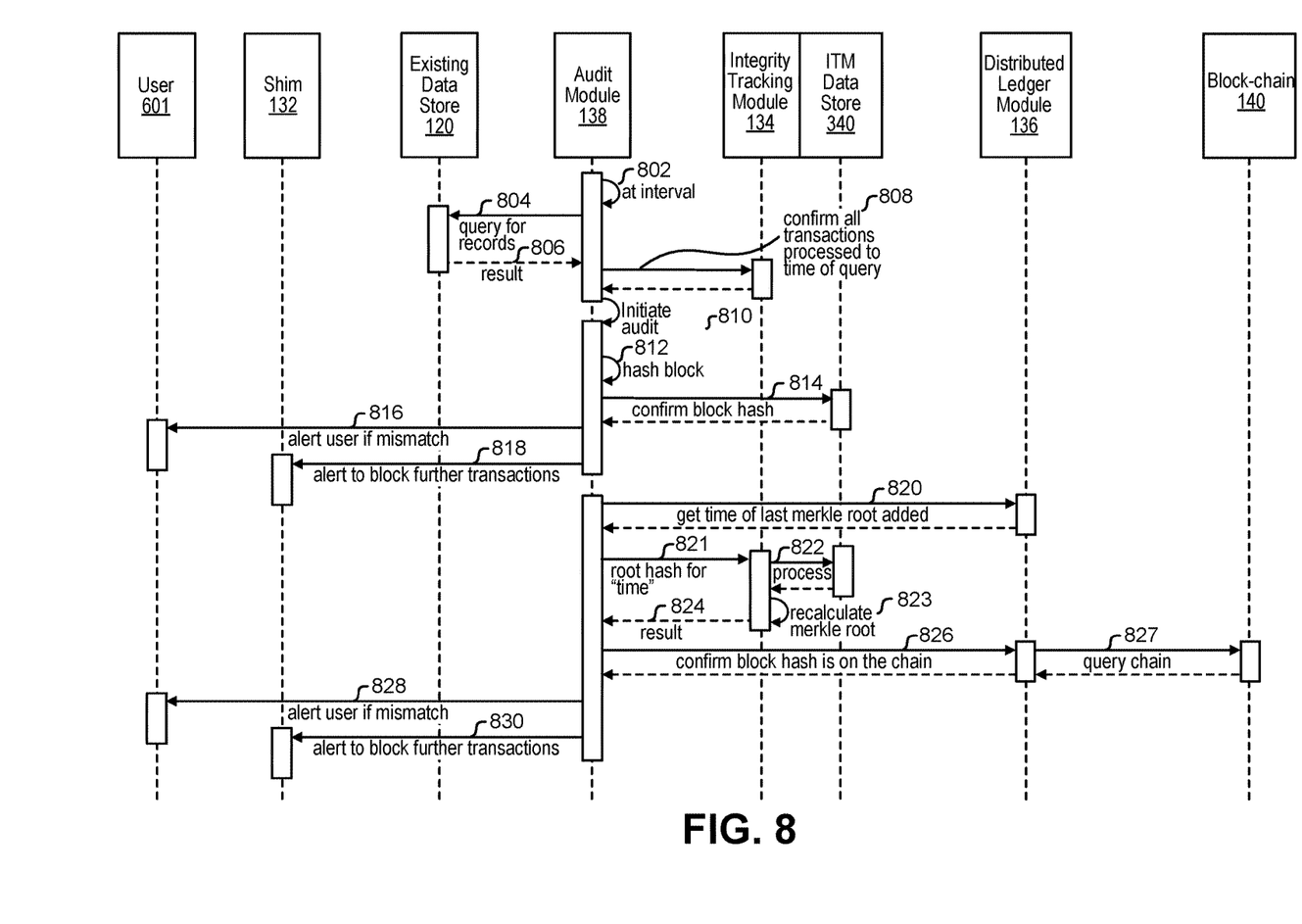
FIG. 8 is an event trace for auditing the integrity of data, according to one embodiment.

FIG. 8 illustrates one embodiment of a method for auditing data integrity. The operations in FIG. 8 are shown as being performed by various entities and/or components and may be performed by a machine have some or all of the components of computer system 500. However, some or all of the operations may be performed by other entities and/or components. In addition, some embodiments may perform certain operations in parallel, perform the operations in different orders, and/or perform different operations.

In the embodiment shown in FIG. 8, the audit method is shown as being triggered 802 at a configurable interval. The interval may be a period of time (e.g., daily, weekly, etc.), a given number of transactions (e.g., every 1,000 transactions, etc.), or the like. The audit method may alternatively or additionally be manually triggered 802 by a user 601 and/or be triggered by certain types of transactions. For example, a transaction that modifies a row that is considered particularly important (e.g., a row relating a new regulatory filing) may trigger 802 an audit to ensure that related data has not been tampered with. In one embodiment, where the existing data store 120 tracks the history of data, an audit may be triggered 802 for a specified time, meaning the time at which the status of the data is to be verified. For example, the specified time may be identified by the user 601 when manually triggering 802 an audit. The audit module 138 may default to the current time or the timestamp of the most recent transaction if no time is specified.

When an audit is triggered 802, the audit module 138 queries 802 the existing data store 804 for the data to be audited. In one embodiment, the data to be audited is an entire database. Alternatively, only portions of the database are audited (e.g., one or more tables that are considered particularly important). In another embodiment, what portions of the database are to be audited can be specified as part of the triggering 802. Where the audit is for a time other than the current time, the existing data store 120 uses an appropriate method (e.g., backing out transactions that occurred after the specified time based on database logs) to determine the state of the data at the specified time. Regardless of the specific query used, the existing data store 120 returns 806 the requested data. In one example embodiment, the requested data is returned 806 sorted by row number and batched into page size portions (the number of rows per page) that correspond to the block size (the number of leafs per block). This may enable significant optimization (e.g., by processing the data page by page).

The audit module 138 confirms 808 that the data received 806 from the existing data store 120 has been processed by the integrity module 134. In one embodiment, the audit module 138 steps through the hashes stored in the ITM data store 340 until it finds the first one with a timestamp more recent than the specified time. If there is not a hash with a timestamp that is least as recent as the specified time, this indicates that there is one or more transactions to process. Accordingly, the audit module 138 may pause and wait for the integrity tracking module 134 to complete processing these transactions. In another embodiment, which may be more efficient, the audit module 138 may query the integrity tracking module 134 to confirm 808 that there are no transactions with timestamps before the specified time yet to be processed.

Assuming all transactions up to the specified time have been processed, the audit module 138 initiates 810 processing of the audit request. In the embodiment shown in FIG. 8, the processing includes first comparing the requested data retrieved from the existing data store to a Merkle tree maintained by the distributed ledger module 136 and then comparing the Merkle tree to the distributed ledger 140. However, in other embodiments, these operations may be performed in the opposite order, consecutively, or partially consecutively.

In the embodiment shown in FIG. 8, to compare the data to the Merkle tree, the audit module 138 determines 812 the hash for each block of the data and confirms 814 that the determined hash matches what is stored in the ITM data store 340 for that block. If the data were returned in page size portions, as described above, the audit module 138 may repeat determining 812 the hash for a portion (i.e., a block) and confirming 814 that it matches with the ITM data store 340 for each portion. Thus, the data may be compared to the Merkle tree efficiently. In other embodiments, the audit module 138 additionally or alternatively compares hashes of the individual leaf nodes and/or the root node to the Merkle tree. Regardless of the specific hashes compared, if a mismatch is found, it indicates a data integrity issue and appropriate corrective action may be taken. For example, the user 601 may be alerted 816 and/or the shim 132 notified 818 to block further transactions.

In the embodiment shown, to compare the Merkle tree to the distributed ledger 140, the audit module 138 obtains 820 the timestamp of the entry in the distributed ledger 140 that corresponds to the specified time (e.g., the most recent hash added to the ledger or the first hash with a timestamp after the specified time). The audit module 138 requests 821 the root node hash for the specified time from the integrity tracking module 134, which processes 822 the request and recalculates 823 the tree as required.

The integrity tracking module 134 sends 824 the root node hash to the audit module 138. The audit module 138 confirms 826 that the root node hash matches what is in the distributed ledger 140 for the specified time. In the embodiment shown, the integrity tracking module 134 does this by sending the root node hash to the distributed ledger module 136, which queries 827 the distributed ledger 140 and then returns the result. If the root node hash in the Merkle tree does not match the corresponding hash in the distributed ledger 140, this indicates a data integrity issue and corrective action may be taken (e.g., alerting 828 the user 601 of the mismatch and instructing 830 the shim 132 to block further transactions).

In an embodiment where the audit is requested for a specified time in the past, the audit module 138 first determines which hash in the distributed ledger 140 to use. If every change to the Merkle tree is appended to the ledger 140 then there can be high precision with regards of the specified time. For example, the audit module 138 may simply count back through the appended hashes until the correct one is found. However, if hashes are appended with some other frequency, then the Merkle tree may be recalculated for a time close to the user specified time at which the hash was appended to the ledger 140. For example, the time for which the Merkle tree is recalculated could be the closest time to the specified time for which there is a timestamp/hash pair (either before or after), the closest time after the specified time for which there is a timestamp/hash pair, or the user may be prompted to select which time to use.

Additional Considerations

The data integrity validation application as disclosed provides benefits and advantages that include greater trust in the data and relatively transparent confirmation of an absence of tampering. Furthermore, the disclosed approaches may be implemented with minimal or no modification required to existing data storage systems and applications. For example, because a shim 132 may operate as a proxy between an existing system 110 and an existing data store 120, both the existing system and data store may continue to operate as if they were communicating directly. Neither needs to be aware of the presence of the shim 132 in the network path.

In addition, because the application may operate continuously, with validation checks being triggered by new transactions, unauthorized modifications to data may be detected quickly and accounted for (e.g., by restoring from a recent backup). Thus, the harm resulting from data tampering can be substantially mitigated. For example, if the data is clinical trial data, the difference between detecting tampering in a monthly audit (or not at all) and within a few minutes using the disclosed approaches may be a handful of results being thrown out rather than a whole study. This may represent savings of millions (if not billions) of dollars in some cases.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms, for example, as illustrated in FIGS. 1 through 4. Modules may constitute either software modules (e.g., code embodied on a machine-readable medium) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors, e.g., 502) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The various operations of example methods described herein may be performed, at least partially, by one or more processors, e.g., processor 502, that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the Internet) and via one or more appropriate interfaces (e.g., application program interfaces (APIs).)

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the invention. This description should be read to include one or at least one and the singular also includes the plural unless it is obvious that it is meant otherwise.

Upon reading this disclosure, those of skill in the art will appreciate still additional alternative structural and functional designs for a system and a process for verifying data has not been tampered with through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method for verifying an absence of data tampering, the method comprising:
   receiving, at a data integrity system located between a client and a remote data store in a computer network, a transaction sent by an application executing on the client, the transaction identifying a portion of data stored in the remote data store and including an update to the portion of data;
   retrieving, by the data integrity system, current content of the identified portion of data, the current content being content of the identified portion prior to applying the update;
   producing, by the data integrity system, a new reduced representation of the current content;
   comparing the new reduced representation to an existing reduced representation of the portion of data;
   responsive to the new reduced representation matching the existing reduced representation:
      updating the existing reduced representation based on the update to the portion of data;

submitting, by the data integrity system, a portion of the updated reduced representation to be appended to the distributed ledger; and verifying, by the data integrity system, that the portion of data is untampered with by an unauthorized entity; and auditing integrity of the data in the remote data store at a point in time after verifying that the portion of data is untampered with, the auditing including using the portion of the updated reduced representation submitted to be added to the distributed ledger to reverify that the portion of data is untampered with by an unauthorized entity.

2. The method of claim 1, wherein receiving the transaction sent by the application comprises:

receiving the transaction by a shim disposed in a network path between the application and the data store, the transaction sent by the application to the data store;

storing, at the data integrity system, information about the transaction, the information including an identifier of the portion of data and the update to the portion of data; and forwarding, by the shim, the transaction to the data store.

3. The method of claim 1, wherein retrieving current content of the identified portion comprises:

querying the data store for content of the identified portion;

identifying that a more recent transaction has updated the content of the identified portion by comparing a timestamp of the transaction with a timestamp of the more recent transaction; and backing out the more recent transaction.

4. The method of claim 3, further comprising storing, responsive to receiving the more recent transaction, an identifier of the more recent transaction in a second data store, wherein verifying that the portion of data is untampered with is further responsive to the identifier of the more recent transaction being present in the second data store.

5. The method of claim 1, wherein the existing reduced representation is a Merkle tree, and updating the existing reduced representation comprises:

updating a leaf node of the Merkle tree based on the portion of data as modified by the update;

updating a block node of the Merkle tree based on the updated leaf node; and updating a root node of the Merkle tree based on the updated block node.

6. The method of claim 1, wherein the auditing the integrity of the data comprises:

comparing the data stored in the data store to the updated existing reduced representation of the data;

comparing the updated existing reduced representation to the portion of the reduced representation appended to the distributed ledger; and reverifying that the portion of data is untampered with responsive to the data stored in the data store matching the updated existing reduced representation of the data and the updated existing reduced representation matching the portion appended to the distributed ledger.

7. The method of claim 6, wherein the existing reduced representation is a Merkle tree and the portion is an existing root node hash of the Merkle tree, and wherein comparing the updated existing reduced representation to the portion appended to the distributed ledger comprises:

obtaining the existing root node hash from the distributed ledger;

obtaining a timestamp of when the existing root node hash was added to the distributed ledger;

calculating a new root node hash based on the timestamp; and confirming that the existing root node hash matches the new root node hash.

8. A system for verifying an absence of data tampering, the system comprising:

a processor; and a computer-readable medium storing instructions that, when executed, cause the processor to:

receive, at a data integrity system located between a client and a remote data store in a computer network, a transaction sent by an application executing on the client, the transaction identifying a portion of data stored in the remote data store and including an update to the portion of data;

retrieve, by the data integrity system, current content of the identified portion of data, the current content being content of the identified portion prior to applying the update;

produce, by the data integrity system, a new reduced representation of the current content;

compare the new reduced representation to an existing reduced representation of the portion of data;

update the existing reduced representation based on the update to the portion of data;

submit, by the data integrity system, a portion of the updated reduced representation to be appended to the distributed ledger;

verify, by the data integrity system, that the portion of data is untampered with by an unauthorized entity if the new reduced representation matches the existing reduced representation; and audit integrity of the data in the remote data store by using the portion of the updated reduced representation submitted to be added to the distributed ledger to reverify that the portion of data is untampered with by an unauthorized entity.

9. The system of claim 8, wherein the instructions to receive the transaction sent by the application comprise instructions that cause the processor to:

receive the transaction by a shim disposed in a network path between the application and the data store, the transaction sent by the application to the data store;

store, at the data integrity system, information about the transaction, the information including an identifier of the portion of data and the update to the portion of data; and forward the transaction to the data store.

10. The system of claim 8, wherein the instructions to retrieve current content of the identified portion comprise instructions that cause the processor to:

query the data store for content of the identified portion;

identify that a more recent transaction has updated the content of the identified portion by comparing a timestamp of the transaction with a timestamp of the more recent transaction; and back out the more recent transaction.

11. The system of claim 10, wherein the instructions further comprise instructions that cause the processor to:

receive the more recent transaction; and store an identifier of the more recent transaction in a second data store, wherein the instructions to verify that the portion of data is untampered with include instructions to verify that the identifier of the more recent transaction is present in the second data store.

12. The system of claim 8, wherein the existing reduced representation is a Merkle tree, and the instructions to update the existing reduced representation comprise instructions that cause the processor to:
  update a leaf node of the Merkle tree based on the portion of data as modified by the update;
  update a block node of the Merkle tree based on the updated leaf node; and
  update a root node of the Merkle tree based on the updated block node.

13. The system of claim 8, wherein the instructions to audit integrity of the data in the remote data store include instructions that cause the processor to:
  compare the data stored in the data store to the updated existing reduced representation of the data;
  compare the updated existing reduced representation to the portion of the reduced representation appended to the distributed ledger; and
  reverify that the portion of data has not been tampered with if the data stored in the data store matches the updated existing reduced representation of the data and the updated existing reduced representation matches the portion appended to the distributed ledger.

14. The system of claim 13, wherein the existing reduced representation is a Merkle tree and the portion is an existing root node hash of the Merkle tree, and wherein the instructions to compare the updated existing reduced representation to the portion appended to the distributed ledger comprise instructions that cause the processor to:
  obtain the existing root node hash from the distributed ledger;
  obtain a timestamp of when the existing root node hash was added to the distributed ledger;
  calculate a new root node hash based on the timestamp; and
  confirm that the existing root node hash matches the new root node hash.

15. A non-transitory computer-readable medium configured to store instructions for verifying an absence of data tampering, the instructions when executed by a processor causing the processor to:
  receive, at a data integrity system located between a client and a remote data store in a computer network, a transaction sent by an application executing on the client, the transaction identifying a portion of data stored in the remote data store and including an update to the portion of data;
  retrieve, by the data integrity system, current content of the identified portion of data, the current content being content of the identified portion prior to applying the update;
  produce, by the data integrity system, a new reduced representation of the current content;
  compare the new reduced representation to an existing reduced representation of the portion of data;
  update the existing reduced representation based on the update to the portion of data;
  submit, by the data integrity system, a portion of the updated reduced representation to be appended to the distributed ledger;
  verify, by the data integrity system, that the portion of data is untampered with by an unauthorized entity if the new reduced representation matches the existing reduced representation; and
  audit integrity of the data in the remote data store by using the portion of the updated reduced representation submitted to be added to the distributed ledger to reverify that the portion of data is untampered with by an unauthorized entity.

16. The non-transitory computer-readable medium of claim 15, wherein the instructions to receive the transaction sent by the application comprise instructions that cause the processor to:
  receive, at the data integrity system, the transaction by a shim disposed in a network path between the application and the data store, the transaction sent by the application to the data store;
  store information about the transaction, the information including an identifier of the portion of data and the update to the portion of data; and
  forward the transaction to the data store.

17. The non-transitory computer-readable medium of claim 15, wherein the instructions to retrieve current content of the identified portion comprise instructions that cause the processor to:
  query the data store for content of the identified portion;
  identify that a more recent transaction has updated the content of the identified portion by comparing a timestamp of the transaction with a timestamp of the more recent transaction; and
  back out the more recent transaction.

18. The non-transitory computer-readable medium of claim 17, wherein the instructions further comprise instructions that cause the processor to:
  receive the more recent transaction; and
  store an identifier of the more recent transaction in a second data store,
  wherein the instructions to verify that the portion of data is untampered with include instructions to verify that the identifier of the more recent transaction is present in the second data store.

19. The non-transitory computer-readable medium of claim 15, wherein the existing reduced representation is a Merkle tree, and the instructions to update the existing reduced representation comprise instructions that cause the processor to:
  update a leaf node of the Merkle tree based on the portion of data as modified by the update;
  update a block node of the Merkle tree based on the updated leaf node; and
  update a root node of the Merkle tree based on the updated block node.

20. The non-transitory computer-readable medium of claim 15, wherein the instructions to audit integrity of the data in the remote data store include instructions that cause the processor to:
  compare the data stored in the data store to the updated existing reduced representation of the data;
  compare the updated existing reduced representation to the portion of the reduced representation appended to the distributed ledger; and
  reverify that the portion of data is untampered with if the data stored in the data store matches the updated existing reduced representation of the data and the updated existing reduced representation matches the portion appended to the distributed ledger.

* * * * *